United States Patent [19]

Mengel

[11] 4,003,053

[45] Jan. 11, 1977

[54] TARGET ADAPTIVE RADAR SYSTEM

[75] Inventor: Clare L. Mengel, McLean, Va.

[73] Assignee: The United States of America as represented by the Secretary of the Navy, Washington, D.C.

[22] Filed: Dec. 16, 1966

[21] Appl. No.: 602,418

[52] U.S. Cl. .............................. 343/14; 343/17.2 R; 343/17.5

[51] Int. Cl.² .......................................... G01S 9/24

[58] Field of Search .................... 343/14, 17.2, 17.5

[56] References Cited

UNITED STATES PATENTS 3,197,773  7/1965  Black et al. ...................... 343/14 X
3,274,595  9/1966  Page ................................. 343/14 X Primary Examiner—Maynard R. Wilbur
Assistant Examiner—Richard E. Berger
Attorney, Agent, or Firm—R. S. Sciascia; Paul S. Collignon

[57] ABSTRACT

A radar system transmitting a signal of given carrier frequency which is frequency modulated at a given rate and wherein the nature of the target return is utilized to eliminate sea and ground clutter. The reflected signal from a hard target has a unique modulation imposed on it by the interference of the incident and reflected waves and this unique modulation is converted to the modulated voltage thereby permitting the use of a video amplifier having a narrow bandwidth.

3 Claims, 4 Drawing Figures

INVENTOR.
CLARE LOUIS MENGEL
Attorneys

TARGET ADAPTIVE RADAR SYSTEM

The invention described herein may be manufactured and used by or for the Government of the U.S. of America for governmental purposes without the payment of any royalties thereon or therefor.

BACKGROUND OF THE INVENTION

The present invention relates to a radar system and more particularly to a radar system that will detect coherent or hard targets and which will discriminate against random or incoherent targets, particularly sea clutter. The present invention purposely codes a transmitted radar signal so that a hard target can be considered as part of the overall system and modifies the return signal or echo so that a radar receiver can enhance the hard target echo.

Clutter, such as echoes from innumerable surface waves, can be particularly bothersome sometimes in radar receivers as clutter is numerous echoes from unwanted objects that obscure a wanted echo signal. The unwanted echo signals confuse the scope picture, or presentation, sufficiently to make an observer's task difficult. While various systems have been developed to reduce the undesirable effects of clutter, such as by use of extremely short pulses, or by pulse compression, these heretofore known systems have not utilized the action of a hard target in distinguishing coherent targets from undesirable clutter.

SUMMARY OF THE INVENTION

The present invention relates to a radar system having a transmitter that provides an output of a given center frequency, and this given center frequency is frequency modulated plus and minus a given frequency at a particular rate. When the transmitted signal strikes a hard point target, the earliest part of the wave train is reflected first and returns along the path of the continuing incident waves. As the frequency is changing rapidly in accordance with the modulation frequency, the uniformly delayed waves due to reflection interfere or combine with the incident waves and produce frequencies which depend on the frequency modulation rate. The reflected signal with its unique modulation is received by the radar receiver and is converted to a modulated voltage at the given modulated frequency by means such as a square law detector. The video amplifier can then have a very narrow bandwidth as no frequencies are of interest except the perfect recovered modulation frequency.

Clutter, such as that caused by reflection from bits of sea waves, does not reflect with a constant time delay or uniformly with frequency. Accordingly, the frequency recovered from these spurious sources will not be at exactly the modulated frequencies, and the action of an intermediate frequency amplifier and a coherent detector following the intermediate frequency amplifier will tend to reduce the clutter returns.

It is therefore a general object of the present invention to provide a radar system having improved means for reducing clutter.

Another object of the present invention is to provide a radar system wherein the nature of a target is instrumental is affecting the return radar signal.

Other objects and advantages of the present invention will be readily appreciated as the same becomes better understood by reference to the following detailed description when considered in connection with the accompanying drawing.

DESCRIPTION OF THE PREFERRED EMBODIMENTS

Figure 1:
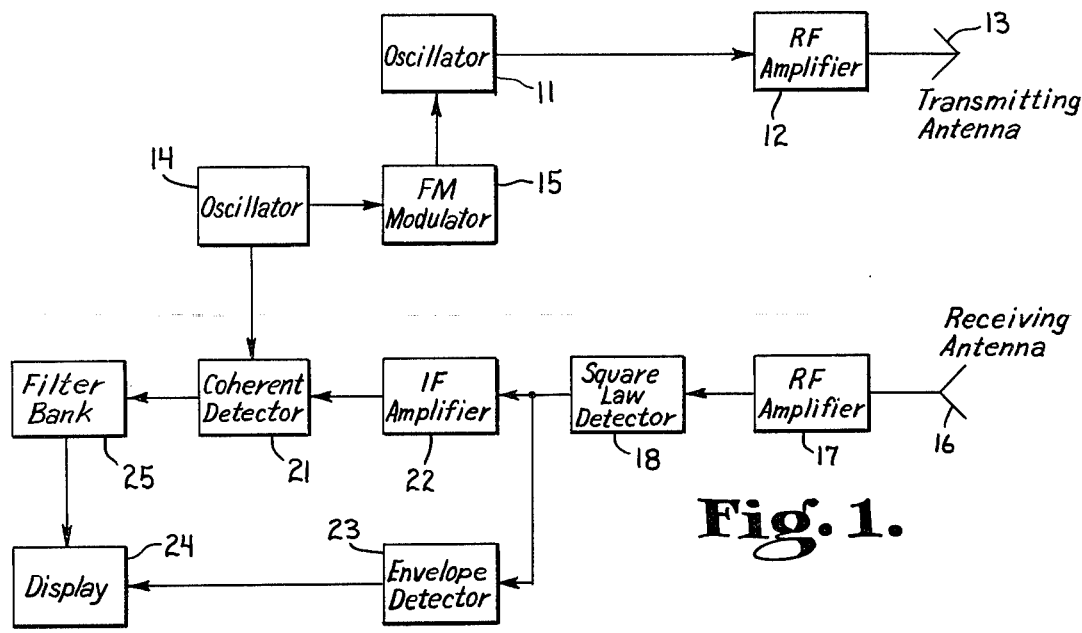
FIG. 1 is a block diagram showing one embodiment of the present invention.
Figure 3:
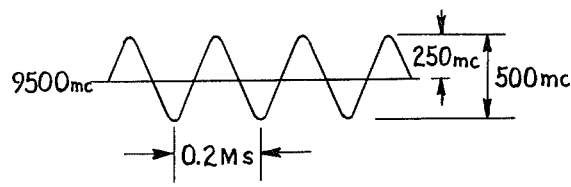
FIG. 3 is a diagram showing a transmitted waveform.

Referring now to FIG. 1 of the drawing, an oscillator 11 is provided, and its output is connected through RF amplifier 12 to a transmitting antenna 13. By way of example, the embodiment of the invention shown in FIG. 1 of the drawing might be an "X"-band radar and oscillator 11 might provide a center frequency of 9500 mc. A second oscillator 14 and an FM modulator 15 are provided and the center frequency of 9500 mc is frequency modulated, and, by way of example, this might be at a value of plus or minus 250 megacycles with a pulse period of 0.2 microseconds, as shown in FIG. 3 of the drawing.

Figure 4:
FIG. 4 is a diagram showing a reflected waveform.

When the frequency modulated signal from transmitting antenna 13 strikes a hard target 19, as shown in FIG. 4 of the drawing, the first part of the wave train is reflected first and is returned along the path of the continuing incident waves. As the frequency is changing rapidly in accordance with the modulation frequency, the uniformly delayed waves, due to reflection, interfere or combine with the incident waves and produce frequencies which depend on the FM modulation rate. The reflected wave, with its unique modulation imposed on it by the interference of the incident wave with the reflected wave, is picked up by receiving antenna 16 and is first amplified by RF amplifier 17 and then converted to the modulated voltage by a square-law detector 18. The function and operation of a square-law detector is more fully explained in U.S. Pat. No. 3,020,397, which issued Feb. 6, 1962, to Roger J. Pierce et al. By way of example, if the modulated voltage, as determined by oscillator 14, is 5 megacycles then the recovered pulses from target 19 are converted in square law detector 18 to the modulated voltage at 5 megacycles.

The output of detector 18 is fed to a coherent detector 21 through an IF amplifier 22 which can have a very narrow bandwidth, as no other frequencies are of interest except the perfect recovered modulation frequency. A second input to coherent detector 21 is provided by oscillator 14, and also an output from detector 18 is provided to envelope detector 23. The output of envelope detector 23 is applied to a suitable display 24, and likewise the output of coherent detector 21 is applied through filter bank 25 to display 24. Coherent detector 21, envelope detector 23, and filter bank 25 are all well-known components of a radar receiver and also display 24 might be one of a number of well-known components of a radar system, such as a cathode ray tube.

In describing the operation of the system shown in FIG. 1 of the drawing, assume that the device is an X-band radar having a center frequency of 9500 megacycles and that this 9500 megacycles is frequency modulated plus and minus 250 megacycles at a rate of 5 megacycles per second. It should be understood, of course, that other parameters can be chosen without departing from the scope of the invention. Oscillator 11 provides the center frequency of 9500 megacycles and oscillator 14 is operated at a frequency rate of 5 megacycles per second. When the wave from transmitting antenna 13 strikes a hard target 19, the earliest part of the wave train is reflected first and is returned along the path of the continuing incident waves. As the frequency of the transmitted wave is changing rapidly in accordance with the modulation frequency, the reflected waves interfere or combine with the incident waves and produce frequencies which depend on the frequency modulation rate. The reflected wave with its unique modulation which is imposed by the interference of the incident and reflected waves is received at antenna 16 and converted in the square law detector 18 to the modulated voltage of 5 megacycles. IF amplifier 22, which is a video amplifier, can have a very narrow bandwidth as only the 5 megacycle frequency is of interest.

Ground clutter and also reflections from bits of sea waves, which is referred to as ground clutter, do not reflect with a constant time delay, or uniformly with frequency. Accordingly, the frequency so recovered from these spurious targets will not be exactly 5 megacycles and, therefore, the filtering action of IF amplifier 22 and the coherent detector 21 will reduce the clutter returns to display 24.

Figure 2:
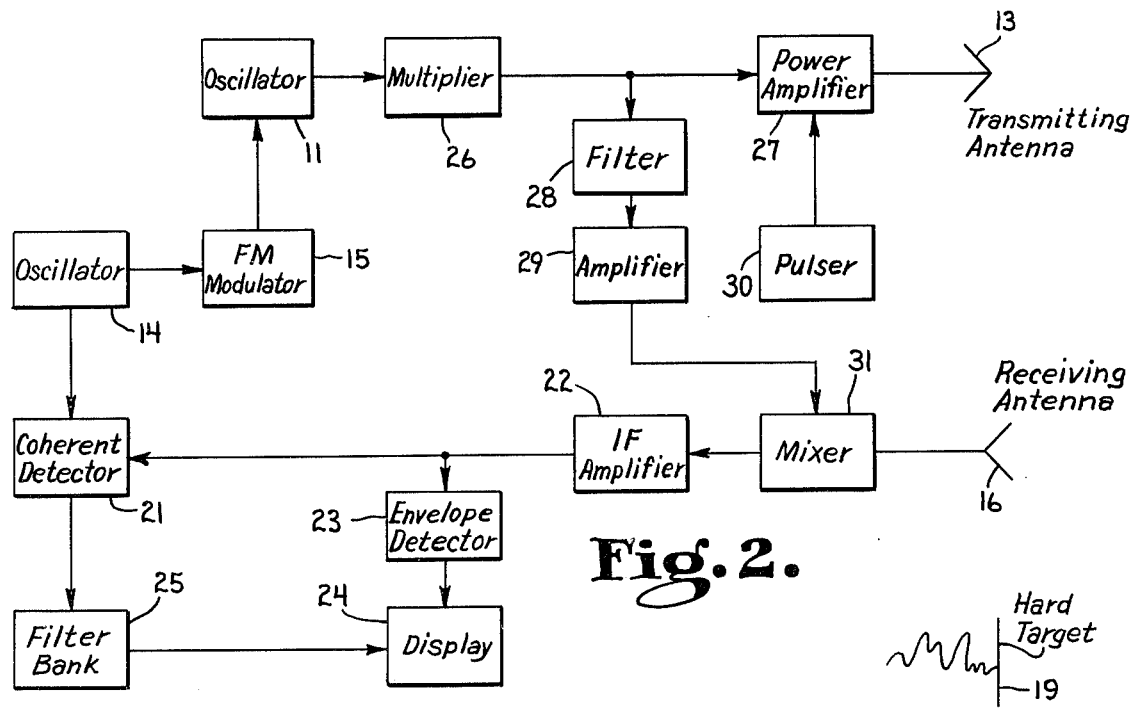
FIG. 2 is a block diagram showing a second embodiment of the present invention.

Referring now to FIG. 2 of the drawing, there is shown a second embodiment of the present invention which provides improved sensitivity in the receiver. The interference between the reflected and the incident energy when mixed in a nonlinear device, as the detector 18 in FIG. 1 of the drawing, results in an amplitude modulated signal with the average carrier being substantially suppressed. Reinsertion of the carrier in a nonlinear mixer 31 will result in an increase in the modulated output of the mixer which is then fed to IF amplifier 22. Assuming the same values as used in describing the operation of FIG. 1, that is, an X-band radar having a center frequency of 9500 megacycles, which is modulated plus and minus 250 megacycles at a rate of 5 megacycles per second, the carrier frequency of 9500 megacycles from oscillator 11 and multiplier 26 is inserted into mixer 31 through filter 28 and amplifier 29. The modulated output of mixer 31 to IF amplifier 22 is 5 megacycles, as determined by oscillator 14 and modulator 15. The output of IF amplifier is then fed to envelope detector 23 and coherent detector 21 and the outputs of these detectors are fed to display 24.

It can thus be seen that the present invention relates to a radar system having improved means for eliminating sea and ground clutter. While a specific example of an X-band radar was described, it should be understood that other parameters can be used without departing from the scope of the invention. Also the devices shown in FIGS. 1 and 2 of the drawing might be utilized in a sonar application. By way of example, a device designed for sonar use might have a 5 kilocycle carrier frequency which is modulated at 30 cycles to a bandwidth of plus and minus 250 cycles.

Obviously many modifications and variations of the present invention are possible in the light of the above teachings. It is therefore to be understood, that within the scope of the appended claims, the invention may be practiced otherwise than as specifically described.

I claim:

1. A target adaptive frequency modulated radar system utilizing a target modulated signal produced by the combining interference of a coherent target reflected wave with a transmitted incident wave for reducing the effects of sea and ground clutter comprising:

means for transmitting a signal of given carrier frequency which is transmitter modulated plus and minus a given frequency value at a given rate for reflection from a coherent target, to produce a target modulated signal indicative of said coherent target by the combining interference of the transmitted incident signal with the reflected signal from said coherent target;

means for recovering said target modulated signal indicative of said coherent target, said recovered target modulated signal being comprised of said transmitter modulated given carrier frequency and frequency modulation produced by the combining of said incident signal with said reflected signal from said coherent target;

means for separating said given carrier frequency from said recovered target modulated signal;

a narrow band video amplifier connected to said means for separating said given carrier frequency from said recovered target modulated signal, for passing and amplifying only the remaining portion of said target modulation signal;

a coherent detector and an envelope detector connected to the output of said narrow band video amplifier; and utilization means actuated by said coherent detector and said envelope detector.

2. A target adaptive frequency modulated radar system utilizing a target modulated signal produced by the combining interference of a coherent target reflected wave with a transmitted incident wave for reducing the effects of sea and ground clutter as set forth in claim 1 wherein, said means for separating said given carrier frequency from said recovered target modulated signal comprises a square law detector.

3. A target adaptive frequency modulated radar system utilizing a target modulated signal produced by the combining interference of a coherent target reflected wave with a transmitted incident wave for reducing the effects of sea and ground clutter as set forth in claim 1 wherein said means for separating said given carrier frequency from said recovered target modulated signal comprises a mixer and wherein said carrier frequency is fed into said mixer from said transmitting means.

* * * * *